Aug. 11, 1959
J. E. JENNINGS
2,899,613
BALANCED VACUUM VARIABLE CAPACITOR
Filed Feb. 19, 1957
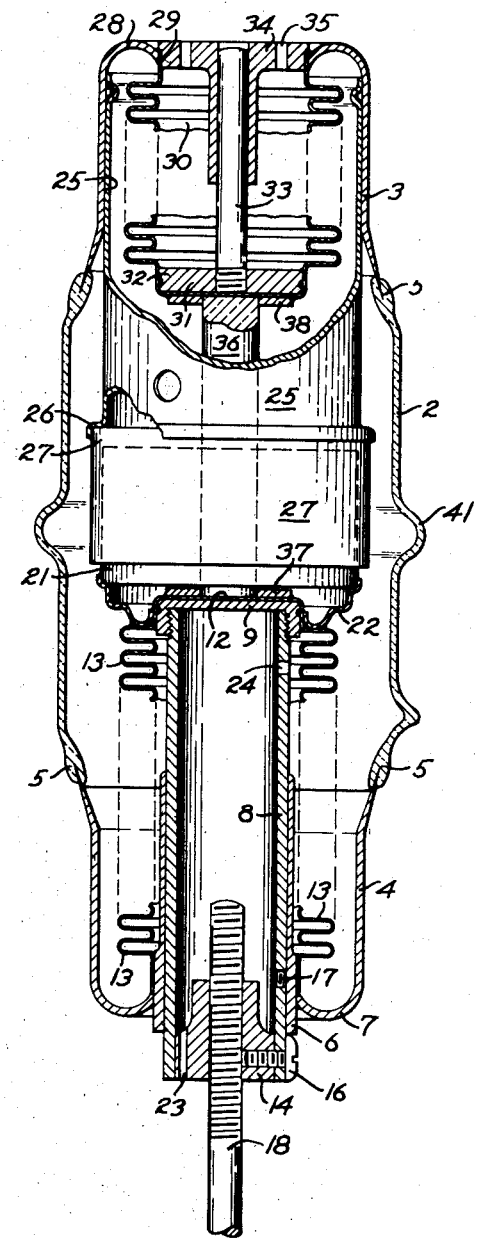
INVENTOR
JO EMMETT JENNINGS
BY
his ATTORNEY United States Patent Office 2,899,613
Patented Aug. 11, 1959

2,899,613

BALANCED VACUUM VARIABLE CAPACITOR

Jo Emmett Jennings, San Jose, Calif., assignor to Jennings Radio Manufacturing Corporation, San Jose, Calif., a corporation of California Application February 19, 1957, Serial No. 641,200

6 Claims. (Cl. 317—245)

My invention relates to vacuum variable capacitors and a principal object of the invention is the provision of a capacitor of this character in which means are provided for equalizing the pressure of the atmosphere so that the applied actuating force at its maximum for moving the mobile plates is little more than nominal.

Another object is the provision of a capacitor in which each of its two ends is hermetically sealed by expansive means such as a bellows, the two bellows being connected and in equilibrium when the mobile condenser plates are in a selected or mid position of adjustment, so that upon adjusting movement of the plates in either direction from the selected or mid position, the applied operating force is the algebraic sum of frictional resistance of the bearings and resilient stress in the bellows.

Other objects will be brought out in the following description of the invention. I do not limit myself to the showing made by said description and drawings, since I may use variant forms of the invention within the scope of the appended claims.

The figure of the drawing is a half sectional view taken on the long central axis of the capacitor. The positions of the parts are those assumed at maximum capacity or full interleaving of the condenser plates.

The electronic industry in various special applications is in need of a fast acting capacitor for certain rapid sequential frequency circuits, and one that requires a very minimum of power to adjust it. If used in aircraft, the unit must be small and lightweight. These considerations rule out the currently popular capacitors in which the mobile end of the envelope is sealed with a bellows. The larger the bellows, the more force is required to overcome the vacuum pressure, and yet small bellows do not permit adequate bearing support.

It is also true that a heavier and more powerful actuator is required for the larger bellows. All of the factors make for heavy and bulky equipment, in which adjustment of the mobile plate is relatively slow, compared to the nearly instantaneous adjustment of the plates in the capacitor of my present invention.

In detail my capacitor comprises a glass or other dielectric shell 2, having metallic end caps 3 and 4 hermetically united to the glass in metal-to-glass seals 5. At the lower end a bearing tube 6, extending into the shell is integrally united as by brazing around its curved-in rim 7 to the open end of the lower end cap 4.

A stem 8 is slidably journaled in the bearing tube; and at its inner end carries a threaded-on crown 9 which forms a seat for the closed end 12 of the metallic bellows 13, which extends down around the stem and bearing tube to the end cap 4, where it is brazed to the end cap and about the bearing tube to form with the end cap, a continuous hermetically tight closure for that end of the shell.

The outer or free end of the stem carries an internally threaded bushing block 14 secured by a screw 16, the head of which serves as a stop to limit penetration of the stem into the bearing tube. The stem is also provided with a threaded hole 17 to receive a stop screw to hold the stem in a withdrawn position in event of need.

Threaded into the bushing block is an actuator link 18, connected to any suitable actuator for adjusting the mobile cylindrical condenser plates 21, arranged concentrically about the closed inner end of the bellows within the generally conical annular bracket 22. Plates, bracket, bellows end and crown are brazed together into a rigid integral assembly, axially movable for desired adjustment by the rigidly connected stem and actuator link. In order to free the stem and bellows assembly within the bearing tube from even a slight air-block, both the bushing block and stem wall are provided with vents 23 and 24 respectively.

The metal end cap 3 is provided with an integrally united cylindrical conductive liner 25, extending downwardly into the envelope and ending in a flanged annular seat 26, which forms a rigid mount for the fixed set of concentric cylindrical condenser plates 27 interleaved with the mobile plates.

The inwardly turned rim 28 of the end cap 3 is integrally united as by brazing to the cylindrical rim 29 of the bellows 30, having the same effective length and diameter as bellows 13. The closed inner end 31 of the bellows 30 is reenforced by a crown plate 32 threaded to the end of the shaft 33, slidably journaled in a bearing block 34, brazed to the bellows outer rim and the contiguous rim 28 of the end cap. Vents 35 allow free passage of air into and out of the bellows.

Interposed between the two bellows 13 and 30 is a dielectric link 36 conveniently made of high alumina ceramic. The ends of the link are metalized and rigidly connected to the ends of the bellows by brazing. A socket ring 37 brazed around the link at bellows end 12 and socket ring 38 brazed around the opposite end at bellows end 31 contribute to the security of the connection, so that both bellows move together as a unit, the bearings 6 and 34 preserving alignment and preventing lateral deformation.

The parts including the link 36 are so proportioned and arranged that when one of the bellows is at maximum expansion, the other is at maximum contraction; and since the bellows are identical in size, there is thus an equilibrium in the air pressure tending to thrust each bellows into its maximum expansion, with the result that the interleaved condenser plates, if without restraint assume a midway balanced position from which movement in either direction is effected with a force only a little more than is needed to overcome frictional resistance in the two slide bearings. Recovery movement from either extreme position toward the mid position may require no applied pressure, but only restraint, by control of the operator connected through the actuator link 18. The frictional component of the bearings is of course present in all adjusting movement of the plates 21, although varying slightly with the position of the unit. Weight of moving parts is a component; and so also is the resilient strain in the bellows folds. In some uses inertia and momentum are components in determining the force required for adjustment of the capacitor. However with the balancing of atmospheric pressure and its elimination as a component of operating force, the amount at its greatest value is very small, considering only manual adjustment.

Each of the bellows offers resistance to deformation from the normal position of its folds. These strains added to each other and to the other components of force involved reach only a low maximum at each extreme of adjusting movement. The drawing shows one such extreme in the full interleaving of the plates 21 and 27.

My capacitor is best made by assembling the two ends separately, each in one-half of the dielectric shell, and then fusing the halves together on a line indicated by the circumferential bulge 41.

At this stage the central ceramic link 36 has been brazed to the bellows head 12, socket ring 37 and crown 9; and extends rigidly toward the bellows 30, where its metalized end is seated within the socket ring 38, previously brazed to the bellows head 31. When the shell halves are put together, a small amount of brazing metal of relatively lower melting point than that used generally for brazing other parts in the open air, is first placed within the socket ring 38. Subsequent exposure of the unit in an induction furnace perfects the union without harm to others previously made with higher melting point metal; so that the two bellows ends are rigidly connected and their expansion and contraction limited to axially aligned bearings 6 and 34.

I claim:

1. In a balanced vacuum variable capacitor, a generally cylindrical dielectric shell, an apertured conductive end cap hermetically joined to each end of the shell, a generally cylindrical bellows having an open end integrally united to each end cap around the aperture therein and having a closed end extending into the envelope, a dielectric link mechanically connecting the closed ends of the bellows, fixed condenser plates within the envelope and mounted on an end cap adjacent one of the bellows, mobile condenser plates within the envelope and interleaved with the fixed plates and mounted on the other bellows, and an actuating stem within one of the bellows and fixed to the closed end thereof to control the interleaving of the condenser plates.

2. A capacitor as recited in claim 1 in which a bearing is fixed on the end cap adjacent the mobile condenser plates, and an actuating stem journaled in the bearing is fixed to the closed end of the adjacent bellows.

3. A capacitor as recited in claim 1 in which a slide bearing is rigidly fixed in the open end of each bellows, and a stem slidably journaled in each bearing is fixed to the closed end of the adjacent bellows.

4. A capacitor as recited in claim 1 in which the fixed condenser plates are integrally united with a conductive cylindrical bracket integrally united with the adjacent apertured end cap.

5. A capacitor as recited in claim 1 in which the mobile condenser plates are integrally united in a generally conical bracket integrally united with the adjacent bellows.

6. In a balanced vacuum variable capacitor, a vacuumized envelope, a pair of generally cylindrical bellows arranged in opposite ends of the envelope and each having an open end hermetically joined to the wall of the envelope at an opening therein and having a closed end extending into the envelope, a dielectric link fixed at each end to an associated bellows, fixed condenser plates within the envelope and mounted on the wall thereof adjacent one of the bellows, mobile condenser plates mounted on the other bellows and interleaved with the fixed plates, and a stem within one of the bellows and fixed to the closed end thereof for expanding and contracting the bellows to vary the interleaving of the condenser plates.

References Cited in the file of this patent

UNITED STATES PATENTS

| | | |
|---|---|---|
| 2,368,278 | Warshaw | Jan. 30, 1945 |
| 2,536,628 | Denisoff | Jan. 2, 1951 |
| 2,575,726 | Peck | Nov. 20, 1951 |
| 2,740,926 | Jennings | Apr. 3, 1956 |